United States Patent
Ji et al.

(10) Patent No.: US 9,775,078 B2
(45) Date of Patent: *Sep. 26, 2017

(54) METHOD AND APPARATUS FOR MITIGATING DATA LOSS DURING AUTONOMOUS SYSTEM INFORMATION READING

(71) Applicant: QUALCOMM Incorporated, San Diego, CA (US)

(72) Inventors: Tingfang Ji, San Diego, CA (US); Peter Gaal, San Diego, CA (US); Gene Fong, San Diego, CA (US); Kapil Bhattad, Bangalore (IN); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,719

(22) Filed: Oct. 19, 2015

(65) Prior Publication Data

US 2016/0044549 A1 Feb. 11, 2016

Related U.S. Application Data

(63) Continuation of application No. 13/007,950, filed on Jan. 17, 2011, now Pat. No. 9,179,395.

(Continued)

(51) Int. Cl.
*H04W 72/04* (2009.01)
*H04W 36/00* (2009.01)
(Continued)

(52) U.S. Cl.
CPC ....... *H04W 36/0061* (2013.01); *H04L 1/1845* (2013.01); *H04L 1/1867* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS 5,070,500 A * 12/1991 Horinouchi .......... G06K 7/0008
340/10.51
5,717,830 A * 2/1998 Sigler ................ H04B 7/18578
370/327

(Continued)

FOREIGN PATENT DOCUMENTS

EP 2129161 A1 12/2009
JP 2008263582 A 10/2008
(Continued)

OTHER PUBLICATIONS

European Search Report—EP13178024—Search Authority—The Hague—dated Aug. 22, 2013.

(Continued)

*Primary Examiner* — Robert C Scheibel
*Assistant Examiner* — Prenell Jones

(57) ABSTRACT

Techniques for mitigating data loss during autonomous system information (SI) reading by a user equipment (UE) are described. For autonomous SI reading, the UE may autonomously determine when to read system information from neighbor cells and may not inform a serving cell. In one design, the UE may autonomously select a SI reading gap for reading system information from a neighbor cell. During the SI reading gap, the UE may suspend reception of downlink transmission from the serving cell, receive system information from the neighbor cell, and maintain capability to transmit on the uplink to the serving cell. In one design, the serving cell may determine SI reading gaps autonomously selected by the UE for reading system information from neighbor cells. The serving cell may communicate with (Continued)

the UE by accounting for the SI reading gaps of the UE, e.g., may suspend communication with the UE during the SI reading gaps.

25 Claims, 7 Drawing Sheets

Related U.S. Application Data

(60) Provisional application No. 61/295,899, filed on Jan. 18, 2010.

(51) Int. Cl.
*H04W 48/16* (2009.01)
*H04L 1/18* (2006.01)
*H04W 56/00* (2009.01)

(52) U.S. Cl.
CPC ....... *H04W 36/0016* (2013.01); *H04W 48/16* (2013.01); *H04W 56/001* (2013.01)

(56) References Cited

U.S. PATENT DOCUMENTS

| | | | |
|---|---|---|---|
| 6,343,205 B1 * | 1/2002 | Threadgill | H04B 7/18539 455/12.1 |
| 6,529,731 B2 * | 3/2003 | Modzelesky | H04B 7/18539 455/427 |
| 2004/0053614 A1 | 3/2004 | Il-Gyu et al. | |
| 2007/0060095 A1 | 3/2007 | Subrahmanya et al. | |
| 2007/0105586 A1 | 5/2007 | Kim et al. | |
| 2007/0283081 A1 * | 12/2007 | Lasser | G06F 12/0246 711/103 |
| 2008/0189970 A1 | 8/2008 | Wang et al. | |
| 2008/0274742 A1 | 11/2008 | Bi | |
| 2009/0086713 A1 | 4/2009 | Luo | |
| 2009/0227255 A1 | 9/2009 | Thakare | |
| 2009/0239533 A1 | 9/2009 | Somasundaram et al. | |
| 2009/0274123 A1 | 11/2009 | Chang et al. | |
| 2009/0274134 A1 | 11/2009 | Wang et al. | |
| 2010/0075651 A1 | 3/2010 | Hallenstaal et al. | |
| 2010/0080166 A1 | 4/2010 | Palanki et al. | |
| 2010/0093350 A1 | 4/2010 | Wang et al. | |
| 2010/0113055 A1 | 5/2010 | Iwamura et al. | |
| 2010/0195525 A1 | 8/2010 | Eerolainen | |
| 2010/0234028 A1 | 9/2010 | Narasimha et al. | |
| 2010/0311343 A1 * | 12/2010 | Keerthi | H04L 5/0023 455/63.1 |
| 2011/0105121 A1 | 5/2011 | Kazmi et al. | |
| 2012/0003975 A2 | 1/2012 | Hole et al. | |
| 2012/0020310 A1 * | 1/2012 | Ji | H04W 48/16 370/329 |
| 2012/0069759 A1 | 3/2012 | Gummadi et al. | |
| 2012/0269146 A1 | 10/2012 | Pajukoski et al. | |

FOREIGN PATENT DOCUMENTS

| | | |
|---|---|---|
| TW | 554635 B | 9/2003 |
| WO | WO-2011126420 A1 | 10/2011 |

OTHER PUBLICATIONS

International Search Report and Written Opinion—PCT/US2011/021575, ISA/EPO—dated May 3, 2011.

Motorola: "Timing Information for Handover to CSG and Hybrid Cells", 3GPP Draft; R2-095926-Timing Infor for INB Mobility, 3rd Generation Partnership Project (3GPP), Mobile Competence Centre; 650, Route Des Lucioles; F-06921 Sophia-Antipolis Cedex; France, vol. RAN WG2, no. Miyazaki, Oct. 6, 2009 (Oct. 6, 2009), XP050604742.

NIT Docomo: "Inter-Frequency/RAT Measurement Gap Control", 3GPP Draft; R2-060841, 3rd Generation Partnership Project (3GPP), Mobile Competence Centre; 650, Route Des Lucioles; F-06921 Sophia-Atipolis Cedex; France, vol. RAN WG2, no. Athens, Greece; Mar. 23, 2006, Mar. 23, 2006 (Mar. 23, 2006), XP050130996.

Qualcomm, "MAC Handling for Measurement Gaps", 3GPPTSG RAN WG1 Meeting #54bis R1-083473, pp. 1-2, Aug. 22, 2008.

Roberto Rimini et al: "A Robust Frequency Tracking Loop at the eNodeB for LTE Uplink" Spread Spectrum Techniques and Applications, 2008. ISSSTA "08. IEEE 10th International Symposium on, IEEE, Piscataway, NJ, USA, Aug. 25, 2008 (Aug. 25, 2008), pp. 97-102, XP031318990 ISBN: 978-1-4244-2203-6 the whole document.

Taiwan Search Report—TW100101863—TIPO—dated May 24, 2013.

* cited by examiner

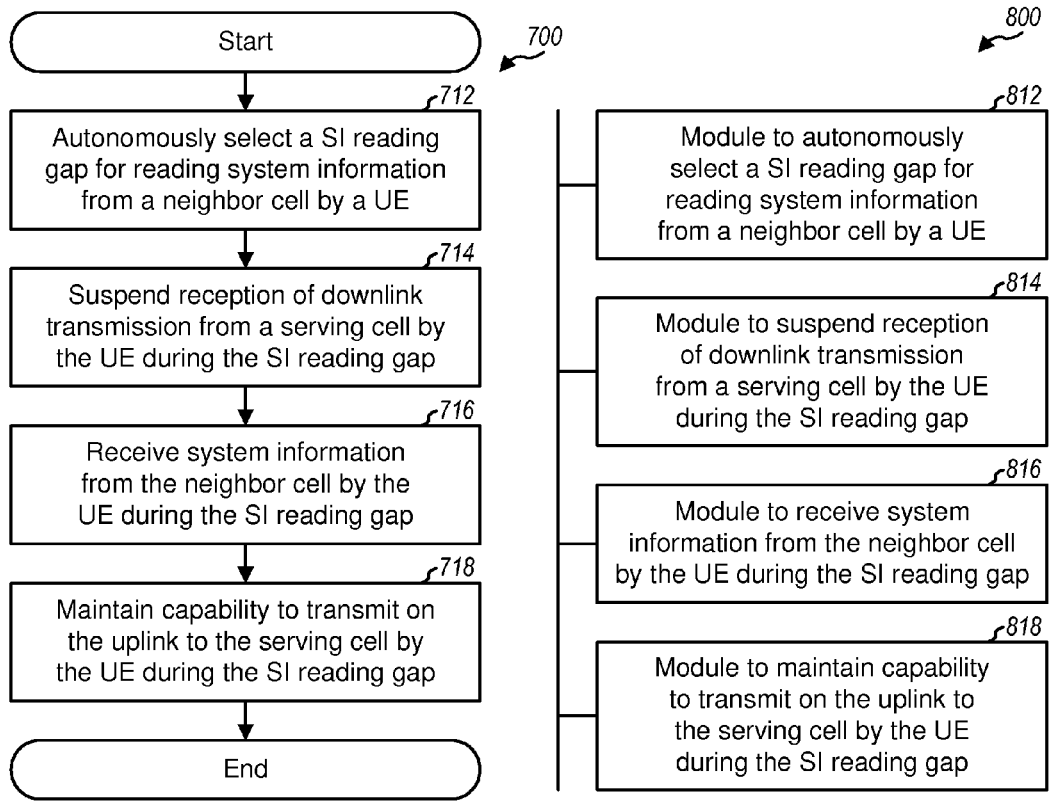
FIG. 7
FIG. 8
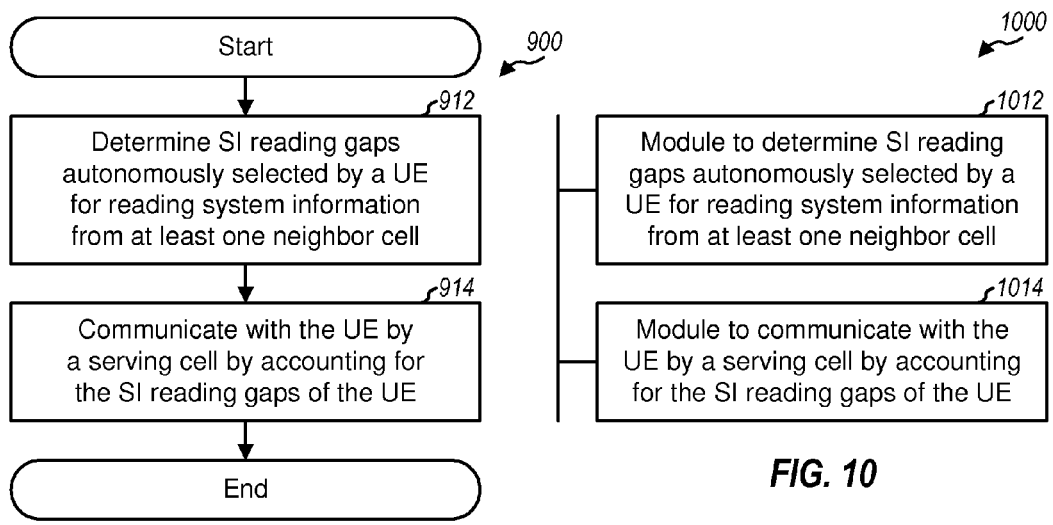
FIG. 9
FIG. 10

METHOD AND APPARATUS FOR MITIGATING DATA LOSS DURING AUTONOMOUS SYSTEM INFORMATION READING

The present application is a continuation application of U.S. application Ser. No. 13/007,950, titled METHOD AND APPARATUS FOR MITIGATING DATA LOSS DURING AUTONOMOUS SYSTEM INFORMATION READING, with a filing date of Jan. 17, 2011, assigned U.S. Pat. No. 9,179,395 with an issue date of Nov. 3, 2015, which claims priority to provisional U.S. Application Ser. No. 61/295,899, entitled METHOD AND APPARATUS THAT FACILITATES MITIGATING PACKET LOSS DURING AUTONOMOUS SYSTEM INFORMATION READING, filed Jan. 18, 2010, both assigned to the assignee hereof and incorporated herein by reference.

BACKGROUND

I. Field

The present disclosure relates generally to communication, and more specifically to techniques for wireless communication.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). Each base station may support one or more cells, where the term "cell" can refer to a coverage area of a base station and/or a base station subsystem serving the coverage area. A UE may communicate with a cell via the downlink and uplink. The downlink (or forward link) refers to the communication link from the cell to the UE, and the uplink (or reverse link) refers to the communication link from the UE to the cell.

A UE may be within the coverage of a number of cells. One cell may be selected to serve the UE and may be referred to as a serving cell. The UE may communicate with the serving cell but may periodically make measurements and/or receive pertinent information from neighbor cells, for example, to check if a neighbor cell is a better candidate for serving the UE than the current serving cell. Data transmission to and/or from the UE may be impacted during the times in which the UE makes measurements and/or receives pertinent information from the neighbor cells. It may be desirable to mitigate data loss during these times.

SUMMARY

Techniques for mitigating data loss during autonomous system information (SI) reading by a UE are described herein. For autonomous SI reading, the UE may autonomously determine when to read system information from one or more neighbor cells and may not inform a serving cell of when the UE will read the system information from the neighbor cell(s). Data loss may occur during the times in which the UE is tuned away from the serving cell to read the system information from the neighbor cell(s). The data loss may be mitigated by the UE and/or the serving cell in various manners.

In one design, the UE may autonomously select a SI reading gap for reading system information from a neighbor cell. The UE may suspend reception of downlink transmission from the serving cell and receive system information from the neighbor cell during the SI reading gap. In one design, the UE may maintain capability to transmit on the uplink to the serving cell during the SI reading gap. In another design, the UE may send information that may be used by the serving cell to ascertain when the UE will tune away to receive system information from neighbor cell(s). The serving cell may use the information to schedule the UE for data transmission on the downlink and/or uplink such that data loss can be mitigated, as described below.

In one design, a serving cell may determine SI reading gaps autonomously selected by a UE for reading system information from at least one neighbor cell. The serving cell may determine the SI reading gaps based on tune away information received from the UE, or timing information for neighbor cells, or detection of missing acknowledgement (ACK) and/or data from the UE, or statistics for data transmission with hybrid automatic repeat request (HARQ) for the UE, etc. The serving cell may communicate with the UE by accounting for the SI reading gaps of the UE. In one design, the serving cell may extend a target termination for data transmission with HARQ for the UE due to the SI reading gaps. In another design, the serving cell may suspend communication with (e.g., avoid sending control information and/or data to) the UE during the SI reading gaps. The serving cell may also perform other actions to mitigate data loss due to the SI reading gaps.

Various aspects and features of the disclosure are described in further detail below.

BRIEF DESCRIPTION OF THE DRAWINGS

FIGS. 7 and 8 show a process and an apparatus, respectively, for mitigating data loss by a UE during autonomous SI reading by the UE.

FIGS. 9 and 10 show a process and an apparatus, respectively, for mitigating data loss by a serving cell during autonomous SI reading by a UE.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
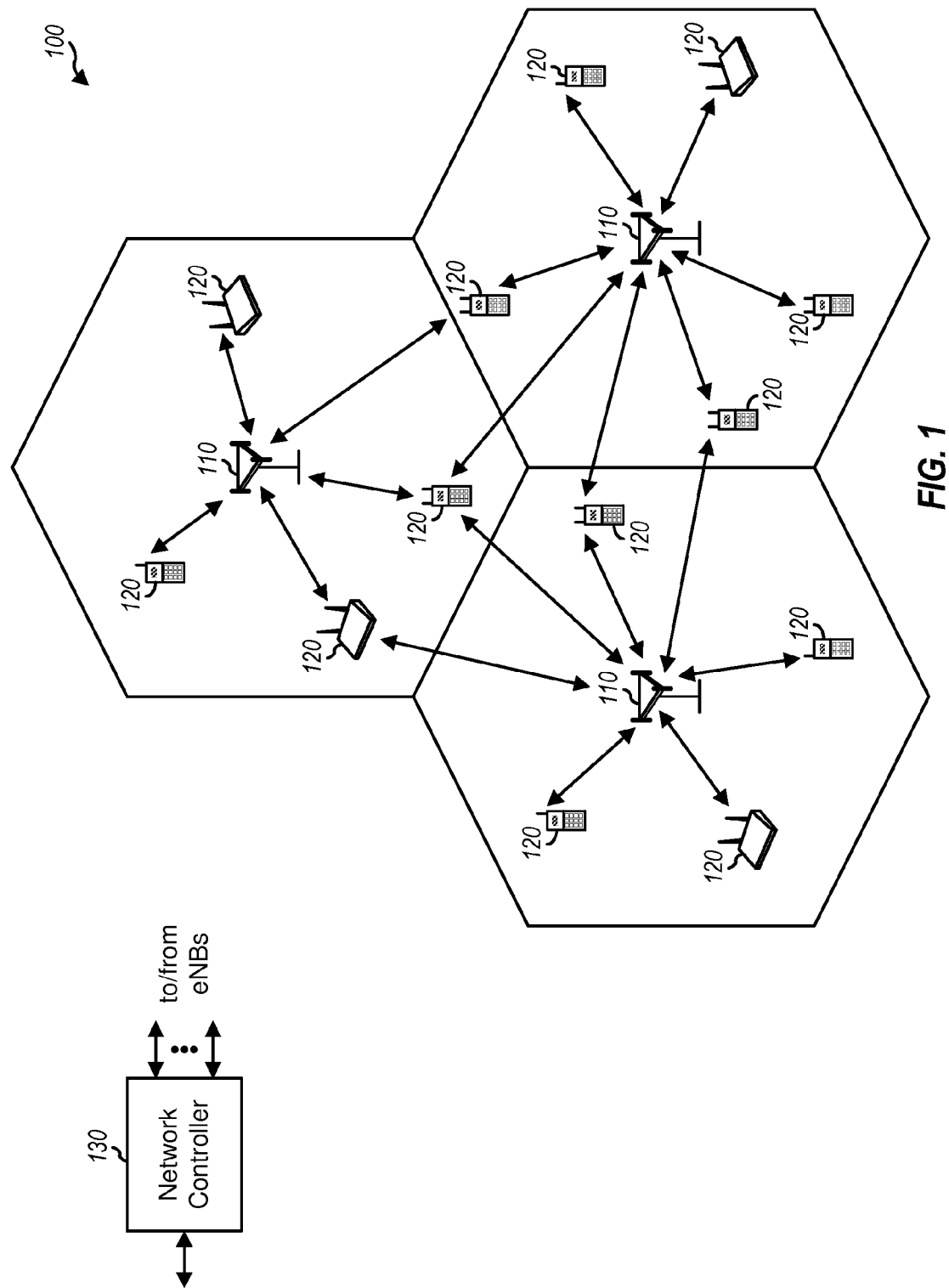
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve system capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

A network controller 130 may couple to a set of eNBs and may provide coordination and control for these eNBs. Network controller 130 may comprise a Mobility Management Entity (MME) and/or some other network entity.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

System 100 may be a synchronous system or an asynchronous system. For a synchronous system, the eNBs may have similar timing, and transmissions from different eNBs may be approximately aligned in time. For an asynchronous system, the eNBs may have different timing, and transmissions from different eNBs may not be aligned in time. The techniques described herein may be used for both synchronous and asynchronous systems.

Figure 2:
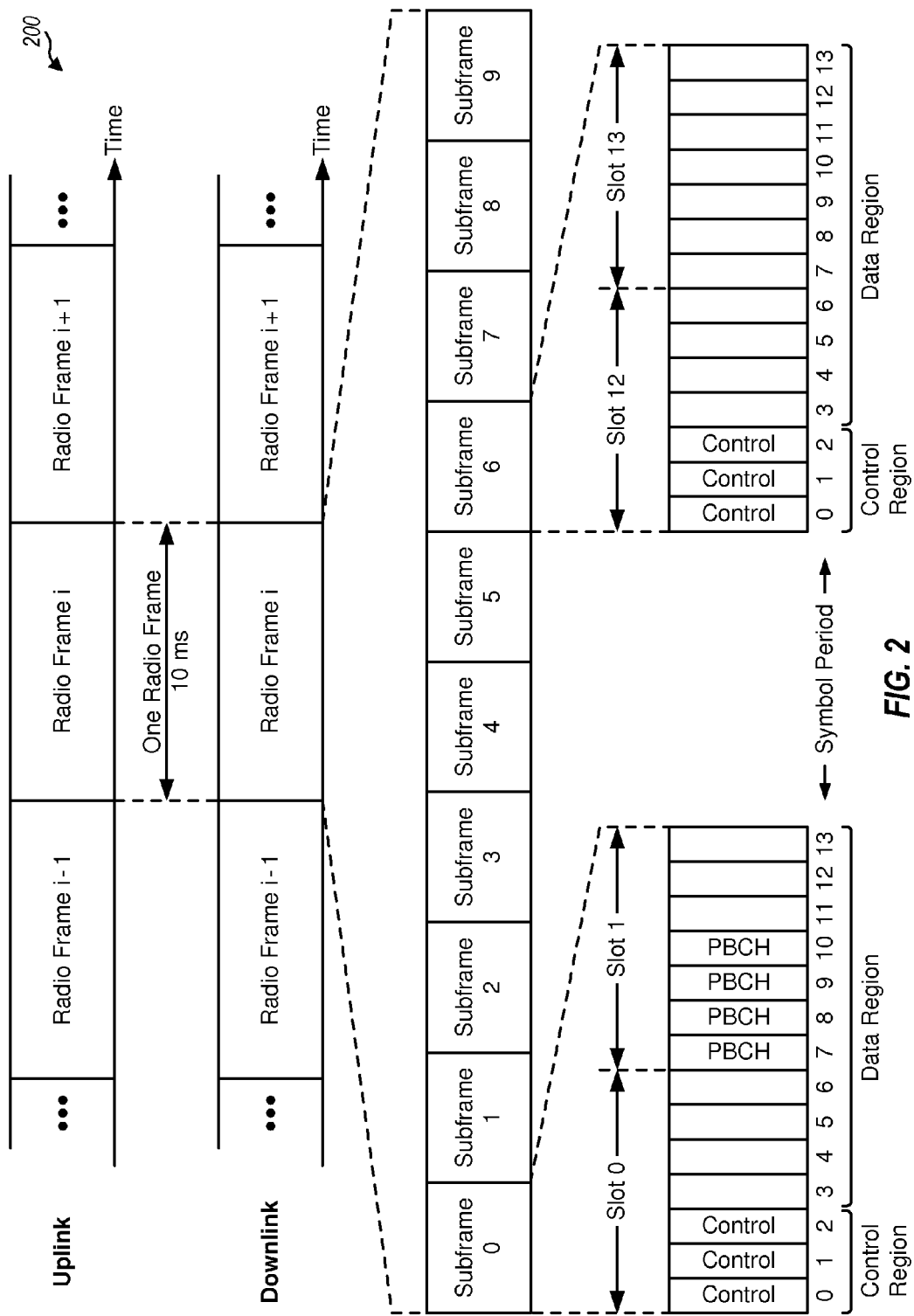
FIG. 2 shows an exemplary frame structure.

FIG. 2 shows a frame structure 200 for frequency division duplexing (FDD) in LTE. For FDD, the downlink and uplink may be allocated separate frequency channels. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

Each subframe for the downlink may include a control region and a data region, which may be time division multiplexed (TDM) as shown in FIG. 2. The control region may include the first K symbol periods of the subframe, where K may be equal to 1, 2, 3 or 4 and may change from subframe to subframe. The control region may carry control information for UEs. The data region may include the remaining symbol periods of the subframe and may carry data and/or other information for UEs.

A cell may transmit a Physical Control Format Indicator Channel (PCFICH), a Physical HARQ Indicator Channel (PHICH), and a Physical Downlink Control Channel (PDCCH) in the control region of a subframe. The PCFICH may be transmitted in the first symbol period of the subframe and may convey the size of the control region (i.e., the value of K). The PHICH may carry acknowledgement (ACK) information on the downlink for data transmission sent on the uplink with HARQ by UEs. The PDCCH may carry downlink control information (DCI) for UEs. The DCI may comprise downlink grants, uplink grants, power control information, etc. The cell may transmit a Physical Downlink Shared Channel (PDSCH) in the data region of a subframe. The PDSCH may carry traffic data for UEs scheduled for data transmission on the downlink.

The cell may transmit a Physical Broadcast Channel (PBCH) in symbol periods 0 to 3 in slot 1 of certain radio frames, as shown in FIG. 2. The PBCH may carry some system information such as a Master Information Block (MIB). The cell may transmit other system information such as System Information Blocks (SIBs) on the PDSCH in certain subframes. The MIB may carry a small amount of the most important system information, and the SIBs may carry the remaining system information. The MIB and SIBs may allow the UEs to receive transmissions on the downlink and/or send transmissions on the uplink.

The system may support HARQ to improve reliability of data transmission and support rate adaptation for varying channel conditions. For HARQ, a transmitter may send a transmission of a transport block and may send one or more additional transmissions, if needed, until the transport block is decoded correctly by a receiver, or the maximum number of transmissions has been sent for the transport block, or some other termination condition is encountered. A transport block may also be referred to as a packet, a codeword, etc. A transmission of a transport block may be referred to as an HARQ transmission.

Figure 3:
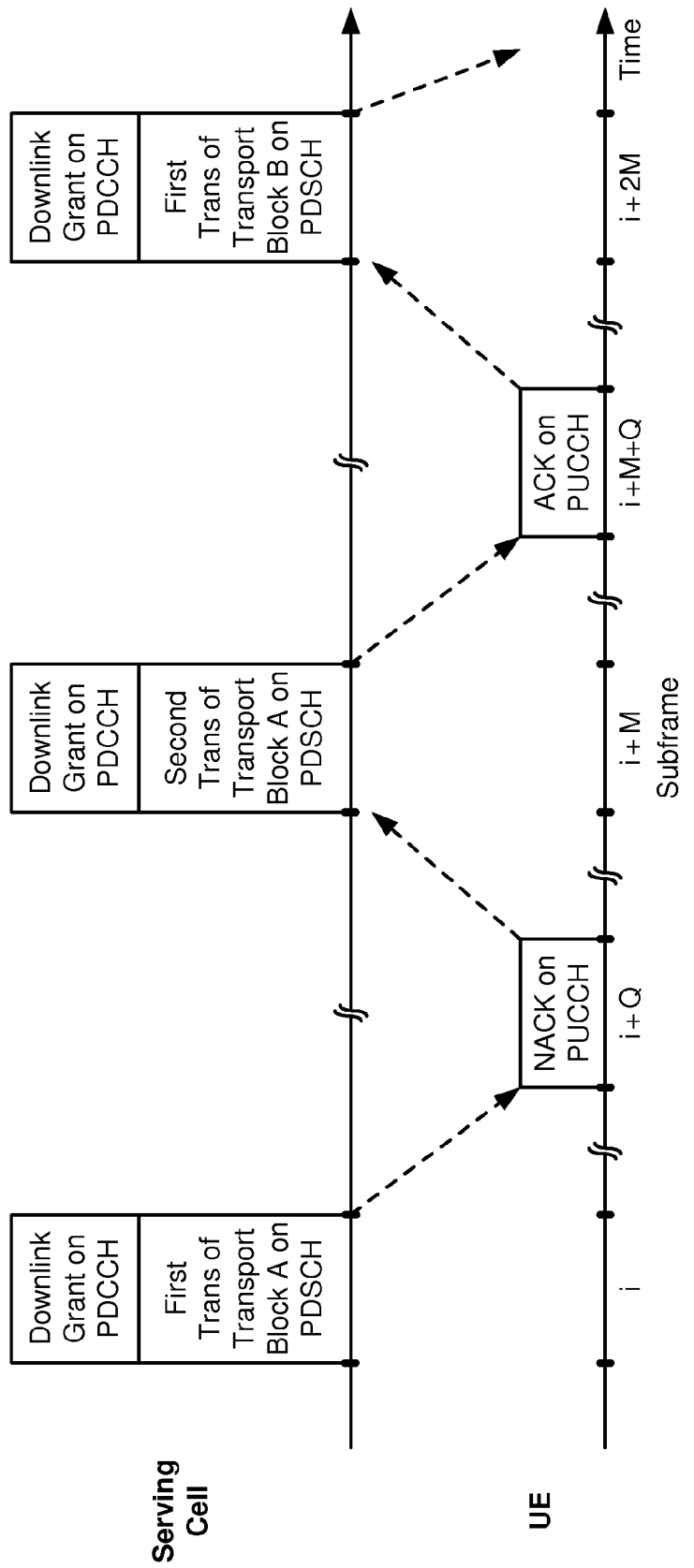
FIG. 3 shows exemplary data transmission on the downlink with HARQ.

FIG. 3 shows an example of data transmission on the downlink with HARQ. A serving cell may have data to send to a UE and may process a transport block A based on a transport format to obtain data symbols. The transport format may be associated with a modulation and coding scheme (MCS), a transport block (TB) size, and/or other parameters for the transport block. The serving cell may send a downlink grant on the PDCCH and a first transmission of transport block A on the PDSCH to the UE in subframe i. The downlink grant may convey pertinent parameters for the first transmission.

The UE may receive the downlink grant and the first transmission of transport block A from the serving cell and may process the first transmission based on the downlink grant. The UE may decode transport block A in error and may send a negative acknowledgement (NACK) in subframe i+Q, where Q is a HARQ feedback delay and may be equal to 4 or some other value. The serving cell may receive the NACK from the UE and may send another downlink grant on the PDCCH and a second transmission of transport block A on the PDSCH in subframe i+M, where M may be equal to 8 or some other value. The UE may receive the downlink grant and the second transmission of transport block A from the serving cell and may process the first and second transmissions. The UE may decode transport block A correctly and may send an ACK in subframe i+M+Q. The serving cell may receive the ACK from the UE and may terminate transmission of transport block A. Other transport blocks may be transmitted on the downlink in similar manner.

Figure 4:
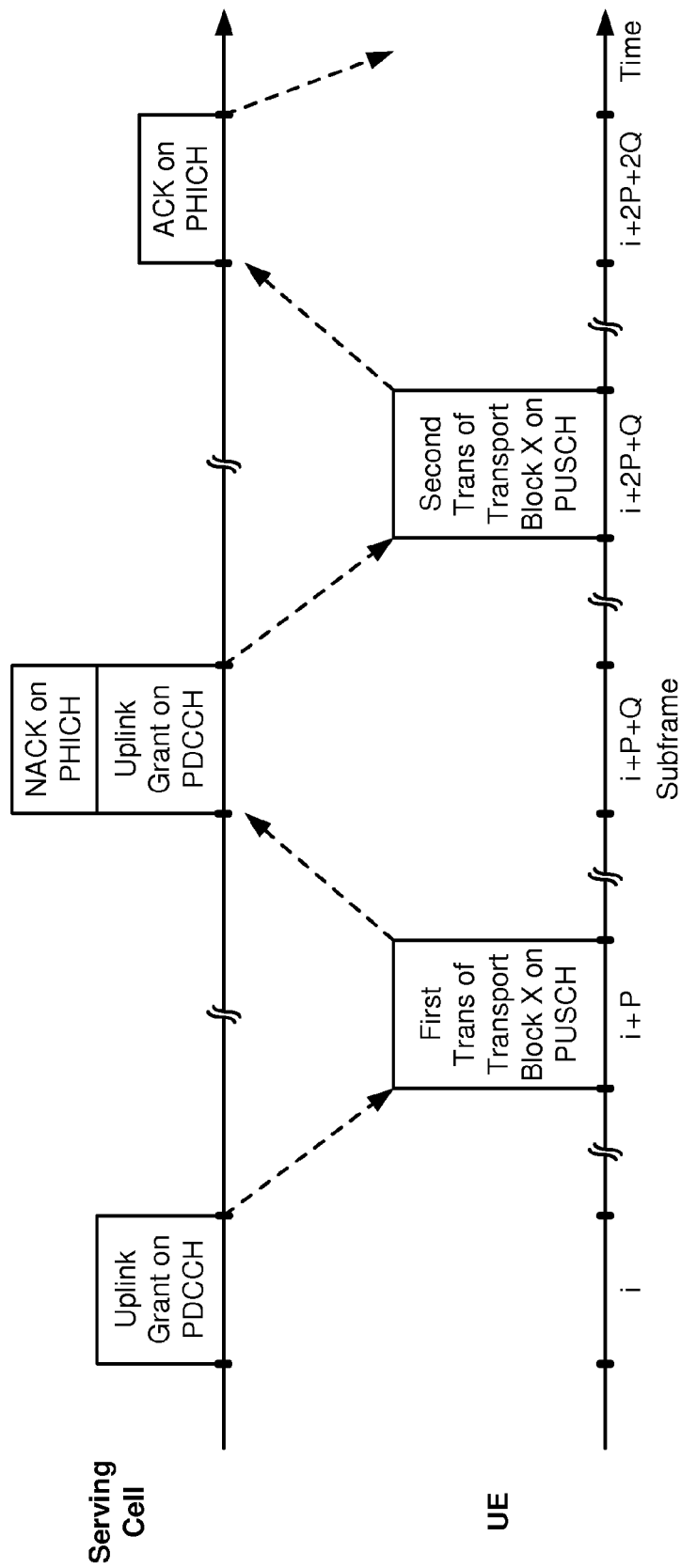
FIG. 4 shows exemplary data transmission on the uplink with HARQ.

FIG. 4 shows an example of data transmission on the uplink with HARQ. A serving cell may receive a scheduling request from a UE, schedule the UE for data transmission on the uplink, and assign resources to the UE. The serving cell may send an uplink grant for the UE on the PDCCH in subframe i. The UE may receive the uplink grant from the serving cell and may send a first transmission of a transport block X, in accordance with the uplink grant, on a Physical Uplink Shared Channel (PUSCH) in subframe i+P, where P may be equal to 4 or some other value. The serving cell may receive and process the first transmission from the UE and may determine that transport block X is decoded in error. The serving cell may then send NACK on the PHICH and another uplink grant on the PDCCH to the UE in subframe i+P+Q, where Q is the HARQ feedback delay. The UE may receive the uplink grant and may send a second transmission of transport block X on the PUSCH in subframe i+2P+Q. The serving cell may receive the second transmission from the UE, process the first and second transmissions, and determine that transport block X is decoded correctly. The serving cell may then send ACK on the PHICH to the UE in subframe i+2P+2Q. The UE may receive the ACK and terminate transmission of transport block X. Other transport blocks may be transmitted on the uplink in similar manner.

LTE supports asynchronous HARQ on the downlink and synchronous HARQ on the uplink. For asynchronous HARQ, each transmission of a transport block may be scheduled and sent in any subframe. For synchronous HARQ, transmissions of a transport block may be sent in subframes that are known a priori by a transmitter and a receiver, e.g., subframes in a single HARQ interlace that includes every M-th subframes, where M may be equal to 8 or some other value. For synchronous HARQ, additional transmissions (i.e., retransmissions) may be triggered by NACK, and grants may or may not be sent for the additional transmissions. For both synchronous and asynchronous HARQ, a transmitter may process (e.g., encode and modulate) each transport block such that it can be reliably decoded by a receiver (e.g., with a certain probability) after a target number of transmissions, which may be referred to as a target termination.

A UE may be within the coverage of a number of cells. One cell may be selected to serve the UE and may be referred to as a serving cell. The UE may periodically make pilot measurements for neighbor cells and may report the pilot measurements to the serving cell. The serving cell may direct the UE to read pertinent system information from neighbor cells of interest. The UE may then read system information from the neighbor cells and may obtain a cell global identity (CGI) and/or other pertinent information for each neighbor cell based on the system information from that neighbor cell. The UE may report the CGIs and/or other pertinent information for the neighbor cells to the serving cell. The serving cell may use the reported information to perform handover and/or other functions.

The UE may perform either inter-frequency or intra-frequency system information (SI) reading for a neighbor cell. For inter-frequency SI reading, the serving cell and the neighbor cell operate on different frequencies, and the UE would tune its radio frequency (RF) receiver away from the frequency of the serving cell to the frequency of the neighbor cell in order to read system information from the neighbor cell. The UE would need some time for RF tuning and convergence of tracking loops, which may be on the order of hundreds of microseconds (p). For intra-frequency SI reading, the serving cell and the neighbor cell operate on the same frequency, and the UE can more quickly switch to the neighbor cell to read system information.

Figure 5:
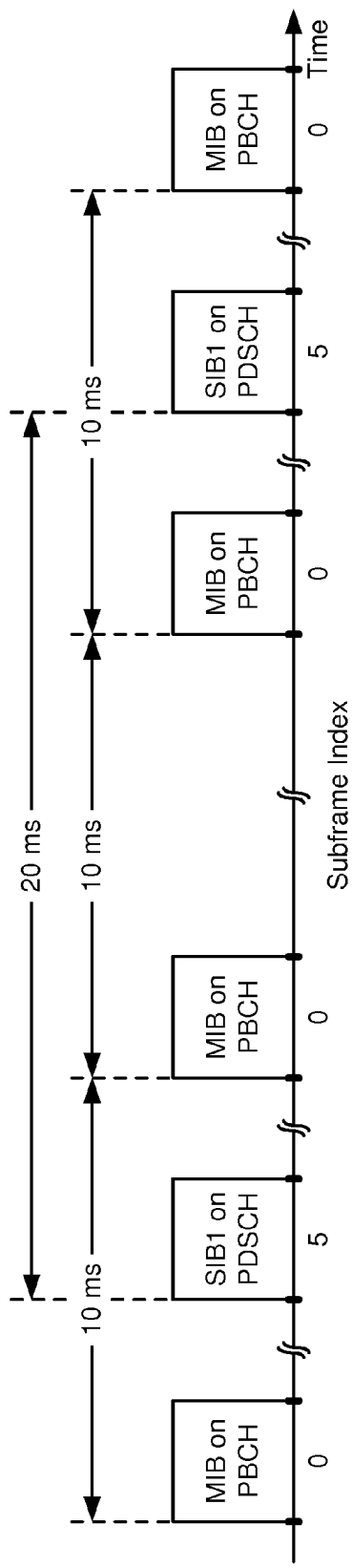
FIG. 5 shows exemplary transmission of system information by a cell.

FIG. 5 shows exemplary transmission of system information by a cell. The cell may transmit the MIB on the PBCH in subframe 0 of every radio frame. The periodicity of the MIB may thus be 10 ms. The cell may also transmit SIB Type 1 (SIB1) on the PDSCH in subframe 5 of every other radio frame. The periodicity of SIB1 may thus be 20 ms. The cell may also transmit SIBs of other types on the PDSCH as scheduled for these SIBs. A UE may read the MIB and SIB1 from a neighbor cell when directed by a serving cell.

Figure 6:
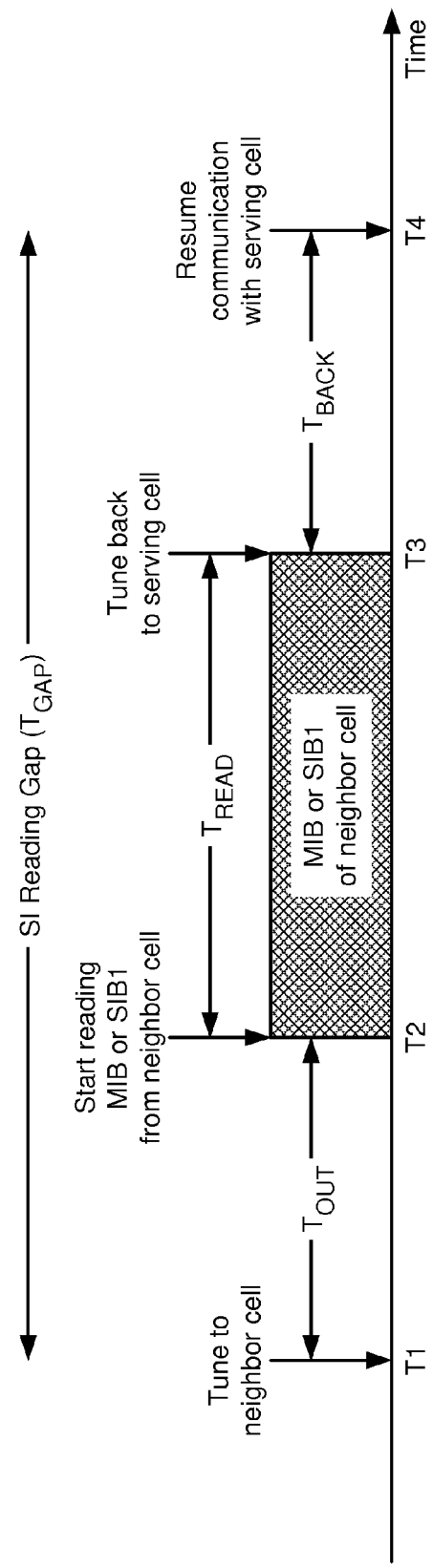
FIG. 6 shows reading of system information from a neighbor cell by a UE.

FIG. 6 shows reading of MIB or SIB1 from a neighbor cell by a UE. The UE may initially communicate with a serving cell. At time T1, the UE may tune away from the serving cell to the neighbor cell. At time T2, the UE may start reading the MIB or SIB1 from the neighbor cell. At time T3, the UE may complete reading the MIB or SIB1 and may tune back from the neighbor cell to the serving cell. At time T4, the UE may resume communication with the serving cell.

As shown in FIG. 6, the amount of time to tune to the neighbor cell may be denoted as $T_{OUT}$. The amount of time to read the MIB or SIB1 may be denoted as $T_{READ}$. The amount of time to tune back to the serving cell may be denoted as $T_{BACK}$. The total amount of time to read the MIB or SIB1 of the neighbor cell once may be referred to as a SI reading gap, a tune-away time, etc. The SI reading gap may be denoted as $T_{GAP}$ and may be equal to $T_{OUT}+T_{READ}+T_{BACK}$. In general, $T_{OUT}$ and $T_{BACK}$ may be dependent on the capabilities of the UE. In one design, approximately 1 ms (or one subframe) may be budgeted for each of $T_{OUT}$ and $T_{BACK}$. $T_{READ}$ may be approximately 1 ms (or one subframe) for the MIB or SIB1. Hence, a total of 3 ms (or three subframes) may be budgeted for a SI reading gap for each reading of the MIB or SIB1 from the neighbor cell. The SI reading gap may also be greater or less than 3 ms.

A neighbor cell may transmit the PBCH every 10 ms, as shown in FIG. 5. The UE may need to receive up to three transmissions of the PBCH carrying the same MIB payload from the neighbor cell in order to correctly decode the MIB under certain poor channel conditions. Since the MIB can change every 40 ms, the UE may need to receive up to five transmissions of the PBCH in order to ensure that the UE can obtain at least three transmissions of the PBCH for the same MIB payload. The UE may tune away from the serving cell for a total of 15 ms in order to read the MIB from the neighbor cell five times. Similarly, the UE may need to receive up to five transmissions of the PDSCH from the neighbor cell in order to correctly decode SIB1 under certain poor channel conditions. The UE may tune away from the serving cell for a total of 15 ms in order to read SIB1 from the neighbor cell five times. In general, the tune away period may be dependent on the number of transmissions the UE needs to decode the MIB or SIB and may change depending on channel conditions.

The total time needed by the UE to read the system information (e.g., the MIB and SIB1) of the neighbor cell may be referred to as the SI reading time for the neighbor cell. A total of 150 ms (or 15 radio frames) may be budgeted for the SI reading time. The UE may tune away to the neighbor cell for only a portion of the SI reading time and may tune to the serving cell for the remainder of the SI reading time.

The system may support autonomous SI reading by UEs. For autonomous SI reading, a UE may autonomously determine when to read system information from one or more neighbor cells and may not inform a serving cell of when the UE will read the system information from the neighbor cell(s). The SI reading gaps of the UE may impact data transmission on the downlink. In particular, the serving cell may not know the SI reading gaps of the UE and may send data on the downlink to the UE during the SI reading gaps. The UE may miss some (e.g., 3) subframes on the downlink for each SI reading gap, and data sent to the UE during each SI reading gap may be lost. The missed subframes on the downlink may also impact data transmission on the uplink due to loss of acknowledgements on the PHICH and loss of uplink grants on the PDCCH, which are sent on the downlink during the SI reading gaps.

The SI reading gaps of the UE may also impact uplink transmission due to other reasons. For inter-frequency SI reading, the UE may tune its RF receiver to a neighbor cell at the start of each SI reading gap. The UE may have one oscillator for a RF receiver for downlink reception (which may be referred to as a downlink oscillator) and another oscillator for a RF transmitter for uplink transmission (which may be referred to as an uplink oscillator). The uplink oscillator may be tied to the downlink oscillator and may also be tuned away when the downlink oscillator is tuned to the neighbor cell for SI reading. The UE may then perform discontinuous transmission (DTX) on the uplink whenever the UE performs inter-frequency SI reading on the downlink. The uplink DTX by the UE during SI reading gaps may be similar to requirements on UEs not transmitting on the uplink during inter-frequency measurement gaps. For intra-frequency SI reading, the UE may maintain its downlink oscillator on the serving cell, and SI reading on the downlink may not lead to uplink DTX by the UE.

Uplink DTX may impact data transmission on the uplink and downlink. The UE may be unable to transmit data to the serving cell during the uplink DTX. Hence, one impact of uplink DTX may be loss of throughput on the uplink. The UE may also be unable to transmit ACK/NACK for data transmission on the downlink during uplink DTX. Hence, another impact of uplink DTX may be loss of throughput on the downlink. For example, if an average number of transmissions for each transport block is 1.1 on the downlink (e.g., when the target termination is one HARQ transmission with 10% error rate), then losing ACK/NACK in a subframe effectively doubles the number of transmissions for each transport block.

Various techniques may be used to mitigate data loss during autonomous SI reading by a UE. Some of the techniques may be applicable to the UE and may be referred to as UE-based designs. Other techniques may be applicable to a serving cell of the UE and may be referred to as cell-based designs.

In a first UE-based design of mitigating data loss during autonomous SI reading, the UE may report an intended tune-away pattern to the serving cell. The UE may have a list of neighbor cells from which to read system information. For each neighbor cell, the UE may determine the timing of the neighbor cell (e.g., relative to the timing of the serving cell) and may ascertain time intervals or SI reading gaps during which the UE intends to read system information from the neighbor cell. In one design, the information for the intended tune-away pattern may include the timing and SI reading gaps for each neighbor cell. In another design, the information for the intended tune-away pattern may include a list of subframes of the serving cell in which the UE intends to tune away to read system information from the neighbor cells. The information for the intended tune-away pattern may also comprise other types of information.

In a second UE-based design of mitigating data loss during autonomous SI reading, the UE may report timing information for the neighbor cells to the serving cell, e.g., before or during the SI reading time of the UE. The timing information for each neighbor cell may include a time offset between the timing of the neighbor cell and the timing of the serving cell. The serving cell may use the timing information for the neighbor cells to ascertain the SI reading gaps of the UE. In particular, the serving cell may determine the start of subframe 0 of each neighbor cell based on the timing information for that neighbor cell. The serving cell may assume that the UE will read system information from each neighbor cell in subframes 0 and 5 of the neighbor cell. The serving cell may then determine the SI reading gaps of the UE based on the known locations of subframes 0 and 5 of the neighbor cells. The serving cell may schedule data transmission on the downlink and/or uplink in a manner to avoid the SI reading gaps of the UE.

In a third UE-based design of mitigating data loss during autonomous SI reading, the UE may decouple the uplink oscillator from the downlink oscillator during SI reading gaps for intra-frequency SI reading, so that uplink DTX can be avoided during the SI reading gaps. The UE may maintain a frequency tracking loop (FTL) and a time tracking loop (TTL) for the downlink for the serving cell and may update the downlink FTL and TTL based on downlink transmissions received from the serving cell. The UE may also maintain a FTL and a TTL for the uplink for the serving cell, which may be tied to the downlink FTL and TTL, and may update the uplink FTL and TTL based on adjustments received from the serving cell. Prior to performing intra-frequency SI reading, the UE may skip updating (e.g., freeze) the uplink FTL and TTL. The UE may update the downlink FTL and TTL based on downlink transmissions from a neighbor cell and may read system information from the neighbor cell with the downlink FTL and TTL tracking the neighbor cell. The UE may maintain the uplink FTL and TTL at the frozen values and may be able to transmit on the uplink to the serving cell even when the downlink FTL and TTL are tracking the neighbor cell.

The UE may also decouple the uplink oscillator from the downlink oscillator during SI reading gaps for inter-frequency SI reading, so that uplink DTX can be avoided during the SI reading gaps. Prior to performing inter-frequency SI reading, the UE may skip updating (e.g., freeze) the uplink FTL and TTL. The UE may then tune to a neighbor cell, update the downlink FTL and TTL based on downlink transmissions from the neighbor cell, and read system information from the neighbor cell. The UE may maintain the uplink FTL and TTL at the frozen values and may be able to transmit on the uplink to the serving cell during the SI reading gaps.

In one design, for both intra-frequency and inter-frequency SI reading, the duration in which the UE can transmit on the uplink without updating the uplink FTL and TTL may be a function of the duration of the SI reading gaps. The frozen FTL and TTL values may be progressively more inaccurate for progressively longer SI reading gaps. Uplink transmission may be allowed for a limited time duration so that FTL and TTL errors are not too large and may be stopped when the TTL and FTL errors become too large.

In general, the UE may implement some or all of the designs described above. The UE may also mitigate data loss due to the SI reading gaps in other manners.

In a first cell-based design of mitigating data loss during autonomous SI reading, the serving cell may extend the target termination for data transmission on the downlink and/or uplink with HARQ for the UE. For example, the serving cell may send N transmissions of each transport block, on average, to the UE without autonomous SI reading, where N is the normal target termination. The serving cell may send N+Z transmissions of each transport block, on average, to the UE with autonomous SI reading, where N+Z is the extended target termination. The normal target termination may be extended by an amount that may be dependent on various factors such as whether the UE is performing intra-frequency or inter-frequency SI reading, the estimated SI reading gaps of the UE, etc.

In a second cell-based design of mitigating data loss during autonomous SI reading, the serving cell may estimate the tune-away pattern of the UE and may schedule data transmission for the UE by taking into account the estimated SI reading gaps of the UE. The serving cell may estimate the tune-away pattern of the UE in various manners. In one design, the serving cell may obtain timing information for the neighbor cells (e.g., via the backhaul or from the UE) and may ascertain the locations of the MIB and SIB1 of each neighbor cell (e.g., relative to the timing of the serving cell). The serving cell may then estimate the SI reading gaps of the UE based on the locations of the MIB and SIB1 of each neighbor cell.

In another design, the serving cell may estimate the tune-away pattern of the UE based on a PUSCH transmission pattern of the UE. Since synchronous HARQ is used for the uplink in LTE, the serving cell should receive data transmission from the UE P subframes after sending NACK to the UE, as shown in FIG. 4. Whenever the serving cell sends NACK to the UE, the serving cell may detect for data transmission from the UE in P subframes later, e.g., by measuring the energy of resource blocks on which the UE is scheduled for uplink data transmission. Repeated missing data transmissions from the UE may indicate that the UE has tuned away to read system information from the neighbor cells during the subframes in which missing data transmissions are detected.

In yet another design, the serving cell may estimate the tune-away pattern of the UE based on a PUCCH transmission pattern of the UE. The serving cell may send data transmission on the downlink to the UE in a given subframe, and the UE should send ACK/NACK on the PUCCH in Q subframes later, as shown in FIG. 3. However, the UE may be unable to send ACK/NACK due to uplink DTX when the UE is reading system information from the neighbor cells. The serving cell may detect for ACK/NACK from the UE after each data transmission sent to the UE. Repeated missing ACK/NACK from the UE may indicate that the UE has tuned away to read system information from the neighbor cells during the subframes in which the missing ACK/NACK is detected.

In yet another design, the serving cell may estimate the tune-away pattern of the UE based on statistics for data transmission on the downlink and/or uplink with HARQ. For example, the serving cell may track the statistics of target termination, missing ACK/NACK, etc. The serving cell may then assume that the UE has tuned away to read system information from the neighbor cells when a change in statistics is detected.

In yet another design, the serving cell may estimate the tune-away pattern of the UE based on a sounding reference signal (SRS) transmission pattern of the UE. The UE may be configured to periodically transmit SRS on the uplink to enable the serving cell to measure the uplink channel quality of the UE. The UE may be unable to transmit the SRS due to uplink DTX during SI reading gaps. The serving cell may detect repeated missing SRS transmissions and may assume that the UE has tuned away to read system information from the neighbor cells.

The serving cell may also estimate the tune-away pattern of the UE in other manners. The serving cell may schedule the UE for data transmission on the downlink and/or uplink by taking into account the estimated tune-away pattern of the UE. This may be achieved in various manners.

In one design, the serving cell may avoid sending control information on the PDCCH and/or data transmissions on the PDSCH to the UE in tune-away subframes, which are subframes in which the UE is expected to tune away for SI reading. In another design, the serving cell may avoid scheduling the UE for new transmission of data on the uplink in the tune-away subframes.

In yet another design, the serving cell may suspend retransmissions from the UE in the tune-away subframes by sending fake ACK on the PHICH to the UE. For example, the serving cell may receive a transmission of a transport block from the UE in subframe i and may send a fake ACK in subframe i+4 to suspend retransmission of the transport block from the UE in tune-away subframe i+8. The serving cell may thereafter send an uplink grant with a new data indicator (NDI) being maintained (i.e., not toggled) in subframe i+12 to schedule the UE for retransmission of the transport block in subframe i+16. The UE may retain the transport block in its buffer until it receives an uplink grant with a toggled NDI. Hence, the UE may send a retransmission of the transport block in subframe i+16 due to the uplink grant received in subframe i+12. If the serving cell is certain that the UE will tune away, then the serving cell may not send a fake ACK since the UE may be unable to transmit on the uplink anyway due to uplink DTX when the UE tunes away.

In one design, the serving cell may skip HARQ combining when the serving cell knows or suspects that the UE will not transmit data on the uplink due to SI reading. The UE may encode a transport block to obtain code bits, generate different transmissions of the transport block based on different subsets of the code bits, and send one transmission of the transport block at a time to the serving cell. Upon receiving a transmission of the transport block from the UE, the serving cell may compute log-likelihood ratios (LLRs) for the subset of the code bits sent in the received transmission. The serving cell may then decode the LLRs for all received transmissions of the transport block. The serving cell may thus typically perform decoding for the transport block based on all transmissions of the transport block received from the UE. However, if the serving cell knows or suspects that a given transmission of the transport block is not sent by the UE due to SI reading, then the serving cell can avoid combining this transmission with prior received transmissions and may use LLRs of 0 for this transmission. The serving cell may thereafter send NACK and/or an uplink grant with the same NDI to the UE to resume transmission of the transport block by the UE.

In one design, the serving cell may select a modulation and coding scheme (MCS) for data transmission on the uplink by the UE to account for SI reading. For example, the serving cell may know or expect the UE to tune to a neighbor cell during subframe i−1, read system information from the neighbor cell in subframe i, and tune back to the serving cell during subframe i+1. Subframes i−1 and i+1 may be partial tune-away subframes in which the UE tunes away for part of each subframe and tunes to the serving cell for the remainder of the subframe. The serving cell may adjust the MCS to account for partial transmission of data by the UE in each partial tune-away subframe. For intra-frequency SI reading, the tune-away time in subframes i−1 and i+1 may be short, e.g., just long enough to adjust the downlink FTL and TTL. Hence, the MCS may be adjusted by a small amount (or not at all) since a small amount of the uplink transmission from the UE may be lost due to the short tune-away time in subframes i−1 and i+1. For inter-frequency SI reading, the tune-away time in subframes i−1 and i+1 may be longer (e.g., about half of each subframe) to tune the RF receiver and adjust the downlink FTL and TTL. Hence, the MCS may be adjusted by a larger amount since more of the uplink transmission from the UE may be lost due to the longer tune-away time in subframes i−1 and i+1.

In one design, the serving cell may mitigate performance loss due to missing ACK/NACK on the uplink from the UE during autonomous SI reading. Missing ACK/NACK on the uplink may occur due to the UE missing a downlink grant sent on the PDCCH and/or data transmission sent on the PDSCH when the UE tunes away to a neighbor cell. For example, the UE may tune away to the neighbor cell in subframe i, may miss data transmission sent by the serving cell to the UE in subframe i, and would not send ACK/NACK in subframe i+4. Missing ACK/NACK on the uplink may also occur due to uplink DTX when the UE tunes away to a neighbor cell. For example, the UE may tune away to the neighbor cell in subframe i and may be unable to send ACK/NACK in subframe i due to uplink DTX. Missing ACK/NACK due to uplink DTX may likely be ACKs if the UE has received the downlink transmissions whereas missing ACK/NACK due to missed PDCCH/PDSCH caused by tune away may likely be NACKs. The serving cell may differentiate between the two missing ACK/NACK cases and may respond differently. In one design, the serving cell may assume that a transport block is decoded correctly by the UE if ACK/NACK is not received for the transport block from the UE. The serving cell may assign a small downlink grant and may send a small retransmission of the transport block to the UE in order to receive an ACK for the transport block from the UE. The serving cell may also send a different transmission of the transport block, which may provide better performance/code than simply repeating the transmission of the transport block that resulted in the missing ACK/NACK.

In general, the serving cell may implement some or all of the designs described above. The serving cell may also mitigate data loss due to the SI reading gaps of the UE in other manners.

FIG. 7 shows a design of a process 700 for mitigating data loss during autonomous SI reading. Process 700 may be performed by a UE (as described below) or by some other entity. The UE may autonomously select a SI reading gap for reading system information from a neighbor cell (block 712). The UE may suspend reception of downlink transmission from a serving cell during the SI reading gap (block 714). The UE may receive system information from the neighbor cell during the SI reading gap (block 716). The UE may maintain capability to transmit on the uplink to the serving cell during the SI reading gap (block 718).

In one design, the UE may update a first FTL for the uplink based on the serving cell when the UE is receiving downlink transmission from the serving cell. The UE may skip updating the first FTL for the uplink based on the serving cell (or freeze the first FTL for the uplink) during the SI reading gap when the UE is receiving system information from the neighbor cell. The UE may send uplink transmission to the serving cell, with the first FTL for the uplink being frozen, during all or part of the SI reading gap.

In one design, the UE may update a second FTL for the downlink based on the serving cell when the UE is receiving downlink transmission from the serving cell. The UE may update the second FTL for the downlink based on the neighbor cell during the SI reading gap.

The UE may also maintain a first TTL and/or other tracking loops for the uplink. The UE may also maintain a second TTL and/or other tracking loops for the downlink. The UE may maintain the tracking loops for the uplink in similar manner as the first FTL. The UE may maintain the tracking loops for the downlink in similar manner as the second FTL. In general, the UE may skip updating at least one tracking loop (e.g., the FTL and/or TTL) for the uplink during the SI reading gap and may send uplink transmission to the serving cell, with the tracking loop(s) for the uplink being frozen, during all or part of the SI reading gap. The uplink transmission may be allowed for a duration that may be determined based on the impact of the frozen tracking loop(s) on system performance.

In one design, the UE may send tune-away information to the serving cell. The tune-away information may be indicative of SI reading gaps during which the UE intends to receive system information from at least one neighbor cell. In another design, the UE may send timing information for the at least one neighbor cell to the serving cell. The timing information may be indicative of the timing of the at least one neighbor cell from which the UE intends to receive system information. The serving cell may use the tune-away information and/or the timing information to communicate with the UE. For example, the serving cell may determine SI reading gaps for the UE based on the tune-away information and/or the timing information and may schedule the UE for data transmission on the downlink and/or uplink such that data loss due to the SI reading gaps can be mitigated, as described above.

In one design, the serving cell and the neighbor cell may operate on the same frequency. The UE may perform intra-frequency SI reading during the SI reading gap. In another design, the serving cell and the neighbor cell may operate on different frequencies. The UE may perform inter-frequency SI reading during the SI reading gap.

FIG. 8 shows a design of an apparatus 800 for mitigating data loss during autonomous SI reading. Apparatus 800 includes a module 812 to autonomously select a SI reading gap for reading system information from a neighbor cell by a UE, a module 814 to suspend reception of downlink transmission from a serving cell by the UE during the SI reading gap, a module 816 to receive system information from the neighbor cell by the UE during the SI reading gap, and a module 818 to maintain capability to transmit on the uplink to the serving cell by the UE during the SI reading gap.

FIG. 9 shows a design of a process 900 for mitigating data loss during autonomous SI reading. Process 900 may be performed by a serving cell for a UE (as described below) or by some other entity. The serving cell may determine SI reading gaps autonomously selected by the UE for reading system information from at least one neighbor cell (block 912). The SI reading gaps are not assigned by the serving cell to the UE. The serving cell may communicate with the UE by accounting for the SI reading gaps of the UE (block 914).

In one design of block 912, the serving cell may receive tune-away information from the UE and may determine the SI reading gaps of the UE based on the tune-away information. In another design, the serving cell may obtain timing information for the at least one neighbor cell, e.g., via the backhaul from the neighbor cell(s) or via the uplink from the UE. The serving cell may determine the SI reading gaps of the UE based on the timing information for the at least one neighbor cell.

In yet another design of block 912, the serving cell may determine the SI reading gaps of the UE based on missing ACK information on the uplink. The serving cell may send transmissions of data on the downlink to the UE and may detect missing transmissions of ACK information from the UE on the uplink. The serving cell may determine the SI reading gaps based on the missing transmissions of ACK information from the UE. In yet another design, the serving cell may determine the SI reading gaps of the UE based on missing data on the uplink. The serving cell may send grants on the downlink to the UE and may detect missing transmissions of data on the uplink from the UE. The serving cell may determine the SI reading gaps based on the missing transmissions of data from the UE. In yet another design, the serving cell may determine the SI reading gaps of the UE based on missing transmissions of SRS on the uplink from the UE. The UE may be configured to send SRS in designated subframes. The serving cell may determine the SI reading gaps based on the missing transmissions of SRS from the UE in all or some of the designated subframes.

In yet another design of block 912, the serving cell may determine the SI reading gaps based on statistics for data transmission with HARQ for the UE. The statistics may relate to missing ACK information, or the number of transmissions of data for correct decoding, etc. The serving cell may also determine the SI reading gaps of the UE in other manners.

In one design of block 914, the serving cell may extend a target termination for data transmission with HARQ for the UE due to the SI reading gaps of the UE. In another design, the serving cell may identify tune-away subframes based on the SI reading gaps of the UE. The UE may tune away from the serving cell during the tune-away subframes to read system information from the neighbor cell(s). The serving cell may suspend communication with the UE on the downlink in the tune-away subframes and may continue communication with the UE on the uplink in the tune-away subframes.

In yet another design of block 914, the serving cell may send control information on the PDCCH to the UE in subframes other than the tune-away subframes. In yet another design, the serving cell may schedule the UE for new (i.e., initial or first) transmission of data on the PUSCH on the uplink in subframes other than the tune-away subframes.

In yet another design of block 914, the serving cell may send fake ACK to suspend data transmission on the uplink by the UE in the tune-away subframes. The serving cell may receive a transmission of a transport block from the UE in a first subframe. The serving cell may send a fake ACK for the transport block to the UE in a second subframe to suspend transmission of the transport block from the UE in a third subframe, which may be one of the tune-away subframes. The serving cell may schedule the UE for transmission of the transport block in a fourth subframe after the third subframe.

In yet another design of block 914, the serving cell may avoid HARQ combining in the tune-away subframes. The serving cell may combine multiple transmissions of a transport block received from the UE in multiple subframes other than the tune-away subframes. The serving cell may skip combining at least one transmission of the transport block received from the UE in at least one of the tune-away subframes. The serving cell may decode the multiple transmissions of the transport block, after combining, to recover the transport block from the UE.

In yet another design of block 914, the serving cell may adjust MCS to account for partial tune-away subframes. The serving cell may identify a subframe in which the UE communicates with the serving cell during only a portion of the subframe. The UE may tune away to the neighbor cell or tune back to the serving cell in the remaining part of the subframe. The serving cell may select a MCS for data transmission in the identified subframe to account for the UE communicating with the serving cell during only a portion of the subframe. The serving cell may estimate the amount of time in which the UE communicates with the serving cell in the identified subframe based on whether the UE performs inter-frequency or intra-frequency SI reading.

In yet another design of block 914, the serving cell may send retransmission due to missing ACK information on the uplink. The serving cell may send a transmission of a transport block to the UE in a first subframe. The serving cell may detect missing ACK information for the transport block from the UE in a second subframe. In one scenario, the serving cell may determine that the missing ACK information is likely to be an ACK that is not sent by the UE due to the UE reading system information from a neighbor cell. The serving cell may then send an additional transmission of the transport block to the UE in a third subframe to obtain an ACK for the transport block. The additional transmission of the transport block may be sent to invoke feedback of an ACK from the UE and may be smaller than the earlier transmission of the transport block. Alternatively or additionally, the additional transmission of the transport block may comprise different coded data than that of the earlier transmission of the transport block in order to obtain a better code for the transport block. In another scenario, the serving cell may determine that the missing ACK information is likely to be a NACK that is not sent by the UE due to the UE missing the downlink grant sent on the PDCCH when the UE is reading system information from a neighbor cell. In this case, the serving cell may have a larger data allocation for the UE and/or may send the additional transmission comprising the same coded data that was sent in the earlier transmission.

FIG. 10 shows a design of an apparatus 1000 for mitigating data loss during autonomous SI reading. Apparatus 1000 includes a module 1012 to determine SI reading gaps autonomously selected by a UE for reading system information from at least one neighbor cell, and a module 1014 to communicate with the UE by a serving cell by accounting for the SI reading gaps of the UE.

The modules in FIGS. 8 and 10 may comprise processors, electronic devices, hardware devices, electronic components, logical circuits, memories, software codes, firmware codes, etc., or any combination thereof.

Figure 11:
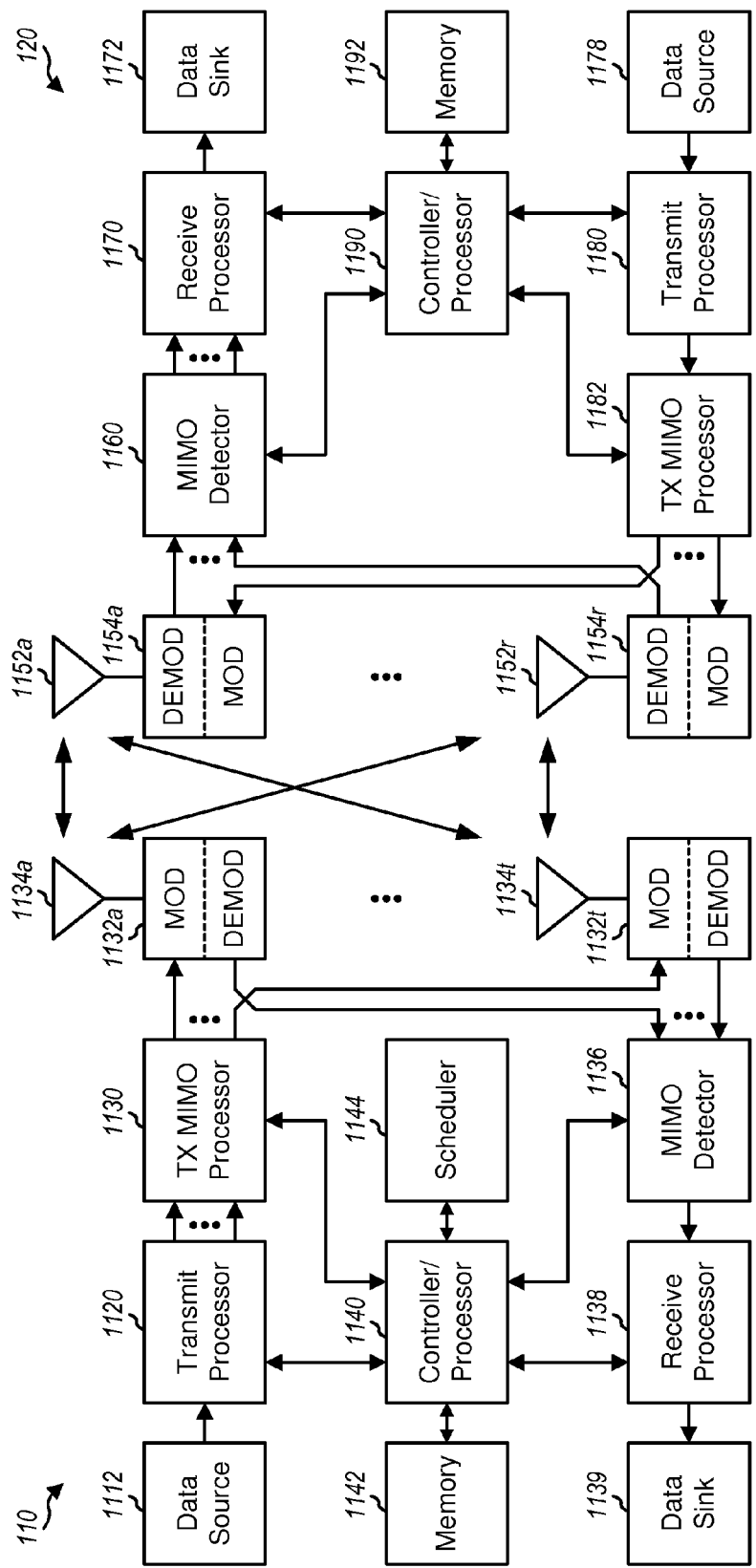
FIG. 11 shows a block diagram of a base station and a UE.

FIG. 11 shows a block diagram of a design of a base station/eNB 110 and a UE 120, which may be one of the base stations/eNBs and one of the UEs in FIG. 1. Base station 110 may be equipped with T antennas 1134a through 1134t, and UE 120 may be equipped with R antennas 1152a through 1152r, where in general T≥1 and R≥1.

At base station 110, a transmit processor 1120 may receive data from a data source 1112 for one or more UEs, process (e.g., encode and modulate) the data for each UE based on one or more modulation and coding schemes selected for that UE, and provide data symbols for all UEs. Transmit processor 1120 may also process control information and provide control symbols. The control information may comprise downlink grants, uplink grants, ACK information, system information, etc. Transmit processor 1120 may also generate reference symbols for synchronization signals and reference signals for each cell supported by base station 110. A transmit (TX) multiple-input multiple-output (MIMO) processor 1130 may precode the data symbols, the control symbols, and/or the reference symbols (if applicable) and may provide T output symbol streams to T modulators (MOD) 1132a through 1132t. Each modulator 1132 may process its output symbol stream (e.g., for OFDM, etc.) to obtain an output sample stream. Each modulator 1132 may further condition (e.g., convert to analog, filter, amplify, and upconvert) its output sample stream and generate a downlink signal. T downlink signals from modulators 1132a through 1132t may be transmitted via T antennas 1134a through 1134t, respectively.

At UE 120, R antennas 1152a through 1152r may receive the downlink signals from base station 110 and other base stations, and each antenna 1152 may provide a received signal to an associated demodulator (DEMOD) 1154. Each demodulator 1154 may condition (e.g., filter, amplify, downconvert, and digitize) its received signal to obtain samples and may further process the samples (e.g., for OFDM, etc.) to obtain received symbols. A MIMO detector 1160 may obtain received symbols from all demodulators 1154, perform MIMO detection on the received symbols if applicable, and provide detected symbols. A receive processor 1170 may process (e.g., demodulate and decode) the detected symbols to obtain decoded data and control information from the serving cell. Processor 1170 may provide the decoded data to a data sink 1172 and the decoded control information to a controller/processor 1190. Receive processor 1170 may also process the detected symbols to obtain system information from neighbor cells and provide the system information to controller 1190.

On the uplink, at UE 120, data from a data source 1178 and control information (e.g., ACK information, etc.) from controller/processor 1190 may be processed by a transmit processor 1180, precoded by a TX MIMO processor 1182 if applicable, further processed by modulators 1154a through 1154r, and transmitted to base station 110. At base station 110, the uplink signals from UE 120 may be received by antennas 1134, processed by demodulators 1132, detected by a MIMO detector 1136 if applicable, and further processed by a receive processor 1138 to recover the data and control information sent by UE 120. Processor 1138 may provide the recovered data to a data sink 1139 and the recovered control information to controller/processor 1140.

Controllers/processors 1140 and 1190 may direct the operation at base station 110 and UE 120, respectively. Processor 1140 and/or other processors and modules at base station 110 may perform or direct process 900 in FIG. 9 and/or other processes for the techniques described herein. Processor 1190 and/or other processors and modules at UE 120 may perform or direct process 700 in FIG. 7 and/or other processes for the techniques described herein. Memories 1142 and 1192 may store data and program codes for base station 110 and UE 120, respectively. A scheduler 1144 may schedule UE 120 and/or other UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   suspending, by a user equipment (UE), reception of downlink transmissions from a serving cell during a system information (SI) reading gap for performing inter-frequency SI reading;
   maintaining, by the UE, a first frequency at an uplink oscillator during the SI reading gap;
   receiving, at the UE, system information from a neighbor cell on a second frequency during the SI reading gap, the second frequency being different from the first frequency and corresponding to a downlink oscillator; and
   maintaining, by the UE, a capability to transmit on an uplink to the serving cell during the SI reading gap such that the UE has the capability to transmit on the uplink to the serving cell and receive the system information on a downlink from the neighbor cell during the SI reading gap.

2. The method of claim 1, in which a duration for transmitting on the uplink is a function of a duration of the SI reading gap.

3. The method of claim 2, further comprising terminating the uplink after the duration for transmitting on the uplink.

4. The method of claim 1, further comprising updating at least one tracking loop for the downlink based at least in part on the neighbor cell during the SI reading gap.

5. The method of claim 1, further comprising updating at least one tracking loop for the downlink based at least in part on the serving cell when the UE is receiving a downlink transmission from the serving cell.

6. A method for wireless communication, comprising:
   transmitting, to a serving cell, timing information for a neighbor cell from which a user equipment (UE) is to receive system information (SI);
   suspending, by the UE, reception of downlink transmissions on a first frequency from the serving cell during a SI reading gap;
   receiving, at the UE, system information on a second frequency from the neighbor cell during the SI reading gap, the second frequency being different from the first frequency and corresponding to a downlink oscillator; and
   maintaining, by the UE, a capability to transmit on an uplink to the serving cell during the SI reading gap such that the UE has the capability to transmit on the uplink to the serving cell and receive the system information on a downlink from the neighbor cell during the SI reading gap.

7. The method of claim 6, in which the timing information comprises a time offset between a timing of the neighbor cell and a timing of the serving cell.

8. The method of claim 6, in which the timing information is used to determine a start of a first subframe of the neighbor cell.

9. The method of claim 8, in which the UE reads the SI during the first subframe and a second subframe of the neighbor cell.

10. The method of claim 9, in which the reception of the downlink transmissions are suspended during at least the first subframe and the second subframe.

11. The method of claim 6, in which the timing information is transmitted before or during the SI reading gap.

12. The method of claim 6, in which the UE performs inter-frequency SI reading during the SI reading gap.

13. A method for wireless communication, comprising:
    transmitting, to a serving cell, tune-away information indicating a system information (SI) reading gap during which a user equipment (UE) is to receive SI from a neighbor cell;
    suspending, by the UE, reception of downlink transmissions on a first frequency from the serving cell during the SI reading gap;
    receiving, at the UE, system information on a second frequency from the neighbor cell during the SI reading gap, the second frequency being different from the first frequency and corresponding to a downlink oscillator; and
    maintaining, by the UE, a capability to transmit on an uplink to the serving cell during the SI reading gap such that the UE has the capability to transmit on the uplink to the serving cell and receive the system information on a downlink from the neighbor cell during the SI reading gap.

14. The method of claim 13, further comprising determining a timing of the neighbor cell relative to a timing of the serving cell.

15. The method of claim 14, further comprising determining the SI reading gap for the neighbor cell based at least in part on the timing of the neighbor cell.

16. The method of claim 15, in which the tune-away information comprises the timing and the SI reading gap for the neighbor cell.

17. The method of claim 15, in which the tune-away information comprises a list of subframes of the serving cell to be used for the SI reading gap.

18. The method of claim 13, in which the UE performs inter-frequency SI reading during the SI reading gap.

19. A user equipment (UE) for wireless communication, comprising:
- a memory unit; and
- at least one processor coupled to the memory unit, the at least one processor being configured:
  - to transmit, to a serving cell, timing information for a neighbor cell from which the UE is to receive system information (SI);
  - to suspend reception of downlink transmissions on a first frequency from the serving cell during a SI reading gap;
  - to receive system information on a second frequency from the neighbor cell during the SI reading gap, the second frequency being different from the first frequency and corresponding to a downlink oscillator; and
  - to maintain a capability to transmit on an uplink to the serving cell during the SI reading gap such that the UE has the capability to transmit on the uplink to the serving cell and receive the system information on a downlink from the neighbor cell during the SI reading gap.

20. The UE of claim 19, in which the timing information comprises a time offset between a timing of the neighbor cell and a timing of the serving cell.

21. The UE of claim 19, in which the timing information is used to determine a start of a first subframe of the neighbor cell.

22. The UE of claim 21, in which the UE reads the SI of the neighbor cell during the first subframe and a second subframe of the neighbor cell.

23. The UE of claim 22, in which the reception of the downlink transmissions are suspended during at least the first subframe and the second subframe.

24. The UE of claim 19, in which the timing information is transmitted before or during the SI reading gap.

25. The UE of claim 19, in which the UE performs inter-frequency SI reading during the SI reading gap.

* * * * *